United States Patent
Xing et al.

(10) Patent No.: US 11,979,858 B2
(45) Date of Patent: May 7, 2024

(54) METHOD AND APPARATUS FOR CONFIGURATION OF SCHEDULING-BASED SIDELINK RESOURCES

(71) Applicant: ZTE CORPORATION, Guangdong (CN)

(72) Inventors: Weimin Xing, Guangdong (CN); Youxiong Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 503 days.

(21) Appl. No.: 17/213,880

(22) Filed: Mar. 26, 2021

(65) Prior Publication Data

US 2021/0235421 A1    Jul. 29, 2021

Related U.S. Application Data

(63) Continuation of application No. PCT/CN2018/108131, filed on Sep. 27, 2018.

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1819* (2013.01); *H04L 27/26025* (2021.01);
(Continued)

(58) Field of Classification Search
CPC . H04W 72/02; H04W 72/20; H04W 72/0446; H04W 72/0453; H04L 27/26025; H04L 1/1819; H04L 27/2607
See application file for complete search history.

(56) References Cited

U.S. PATENT DOCUMENTS

2016/0128115 A1    5/2016  Panteleev et al.
2017/0048829 A1    2/2017  Kim
(Continued)

FOREIGN PATENT DOCUMENTS

CN    107645774 A    1/2018
CN    108353422 A    7/2018
(Continued)

OTHER PUBLICATIONS

Huawei: "Sidelink physical layer structure and procedure for NR V2X", 3GPP TSG-RAN WG1, Meeting #94, R1-1808093, Gothenburg, Sweden; Aug. 20-24, 2018, 6 pages.
(Continued)

*Primary Examiner* — Natasha W Cosme
(74) *Attorney, Agent, or Firm* — Duane Morris LLP (57) ABSTRACT

A method and apparatus for configuration of scheduling-based sidelink resources for (re-) transmitting sidelink signals during sidelink communications in a wireless communication network is disclosed. In one embodiment, a method performed by a first wireless communication node, includes: transmitting a first message to a first wireless communication device; and receiving a second message from the first wireless communication device, wherein the first message comprises first information of at least one first resource for sidelink transmission and second information of at least one second resource for uplink control information (UCI), wherein the second message is received from the first wireless communication device on the at least one second resource.

18 Claims, 4 Drawing Sheets

(51) Int. Cl.
*H04L 27/26* (2006.01)
*H04W 72/0446* (2023.01)
*H04W 72/0453* (2023.01)
*H04W 72/20* (2023.01)

(52) U.S. Cl.
CPC ..... *H04L 27/2607* (2013.01); *H04W 72/0446* (2013.01); *H04W 72/0453* (2013.01); *H04W 72/20* (2023.01)

(56) References Cited

U.S. PATENT DOCUMENTS

2018/0049219 A1 2/2018 Gupta et al.
2018/0254868 A1* 9/2018 Saito ................... H04L 5/0048
2019/0020987 A1* 1/2019 Khoryaev ............ H04W 76/14

FOREIGN PATENT DOCUMENTS

| | | |
|---|---|---|
| EP | 3372028 | 9/2018 |
| KR | 2016-0142348 A | 12/2016 |
| WO | 2017075798 A1 | 5/2017 |
| WO | 2018004322 A1 | 1/2018 |

OTHER PUBLICATIONS

Huawei: "Sidelink control channel design of NR V2X", 3GPP TSG-RAN WG1, Meeting # 94, R1-1808937, Gothenburg, Sweden; Aug. 20-24, 2018, 4 pages.
Huawei: "Introduction of V2V into TS36.212", 3GPP TSG-RAN WG1, Meeting # 86, R1-168224, Gothenburg, Sweden; Aug. 22, 2016-Aug. 26, 2016, Sep. 14, 2016, 8 pages.

* cited by examiner

| Index (302) | Format (304) | Starting symbol (306) | Number of symbols (308) | Starting PRB (310) |
|---|---|---|---|---|
| 0 | 0 | 12 | 2 | 0 |
| 1 | 1 | 1 | 4 | 0 |
| .... | | | | |
| N | 3 | 0 | 14 | 2 |

FIG. 3

METHOD AND APPARATUS FOR CONFIGURATION OF SCHEDULING-BASED SIDELINK RESOURCES

TECHNICAL FIELD

This disclosure relates generally to wireless communications and, more particularly, to a method and apparatus for configuration of scheduling-based sidelink resources for (re-)transmitting sidelink signals during sidelink communications in a wireless communication network.

BACKGROUND

Sidelink (SL) communication is a wireless radio communication directly between two or more user equipment devices (hereinafter "UE"). In this type of communication, two or more UEs that are geographically proximate to each other can directly communicate without going through a base station (BS), e.g., an eNB in an long-term evolution (LTE) system or a gNB in New Radio, or a core network. Data transmission in sidelink communications is thus different from typical cellular network communications, in which a UE transmits data to a BS (i.e., uplink transmissions) or receives data from a BS (i.e., downlink transmissions). In sidelink communications, data is transmitted directly from a source UE to a destination UE through the Unified Air Interface, e.g., PC5 interface. Sidelink communications can provide several advantages, for example reducing data transmission load on a core network, system resource consumption, transmission power consumption, and network operation costs, saving wireless spectrum resources, and increasing spectrum efficiency of a cellular wireless communication system.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

With the increase of the demand for direct communication, sidelink communication is required to support different types of services. In a conventional sidelink communication, a source UE generally uses blind retransmission during a broadcast transmission to a target UE. In a unicast and/or group-cast transmission process, the target UE may need to transmit a feedback to the source UE, so that the retransmission is only performed when previous sidelink transmission is failed indicated in the feedback, e.g., a NACK is received by the source UE from the target UE. In a unicast and/or multicast transmission process, a sidelink resource and a sidelink retransmission resources can be pre-configured by the BS and allocated to the UE 104. However, since the BS does not directly participate in the sidelink communication, and the BS cannot directly obtain the status of the Sidelink transmission (e.g., fail or success). Therefore, a method and apparatus for configuration of sidelink resources for retransmitting sidelink signals during sidelink communications in the present disclosure can perform efficient, dynamic sidelink resource scheduling so as to reduce the latency, save wireless spectrum resources and increase spectrum efficiency.

In one embodiment, a method performed by a first wireless communication node, includes: transmitting a first message to a first wireless communication device; and receiving a second message from the first wireless communication device, wherein the first message comprises first information of at least one first resource for sidelink transmission and second information of at least one second resource for uplink control information (UCI), wherein the second message is received from the first wireless communication device on the at least one second resource.

In another embodiment, a method performed by a first wireless communication device, includes: receiving a first message from a wireless communication node; and transmitting a second message to the wireless communication node, wherein the first message comprises first information of at least one first resource for sidelink transmission and second information of at least one second resource for uplink control information (UCI), wherein the second message is transmitted from the first wireless communication device on the at least one second resource.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

Figure 1A:
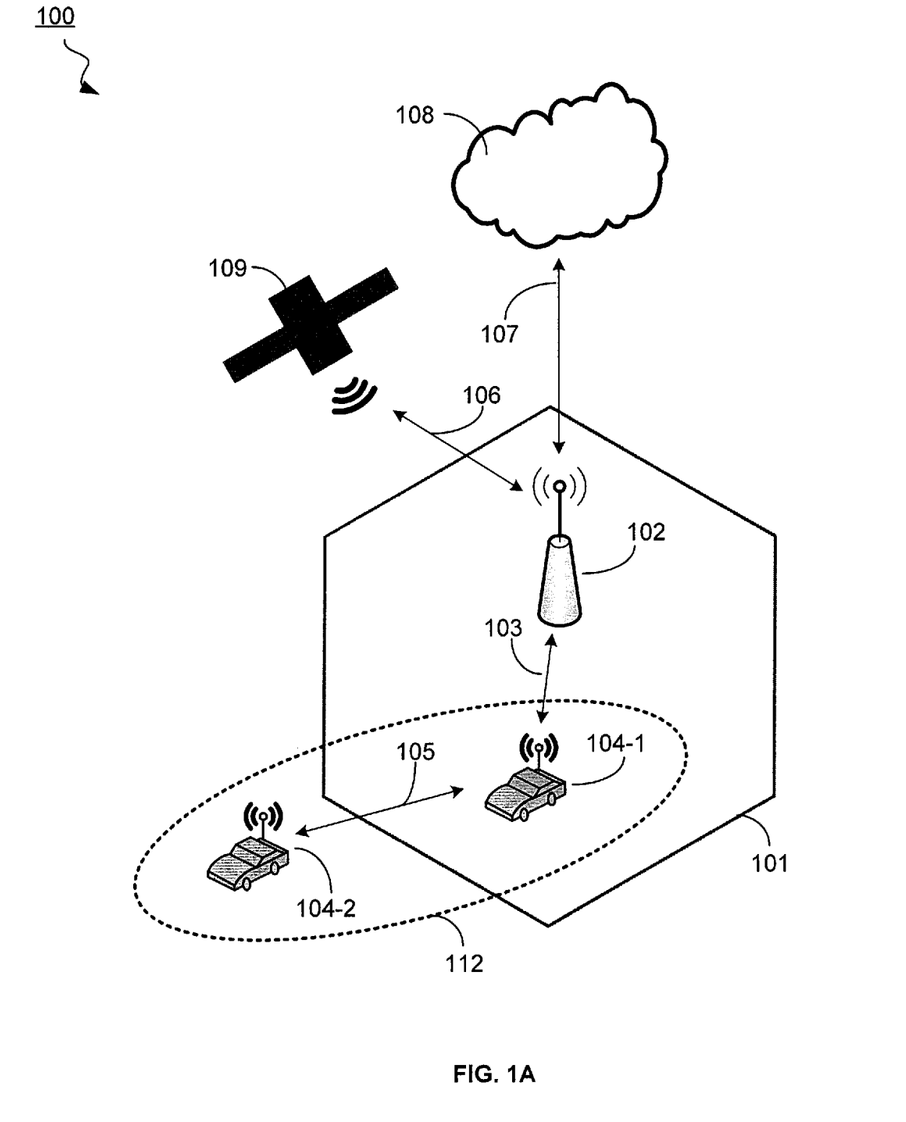
FIG. 1A illustrates an exemplary wireless communication network illustrating achievable modulation as a function of distance from a BS, in accordance with some embodiments of the present disclosure.

FIG. 1A illustrates an exemplary wireless communication network 100, in accordance with some embodiments of the present disclosure. In a wireless communication system, a network-side wireless communication node can be a node B, an E-UTRAN Node B (also known as Evolved Node B, eNodeB or eNB), a gNodeB (also known as gNB) in new radio (NR) technology, a pico station, a femto station, or the like. In some embodiments, a network-side wireless communication node can also comprises a Relay Node (RN), a multicell coordination entity (MCE), a gateway (GW), a sidelink management/control node, a mobility management entity (MME), a EUTRAN Operation/Administration/Maintenance (OAM) device. A terminal-side wireless communication device can be a long range communication system like a mobile phone, a smart phone, a personal digital assistant (PDA), tablet, laptop computer, or a short range communication system such as, for example a wearable device, a vehicle with a vehicular communication system and the like. A network-side wireless communication node is represented by a base station (BS) 102 hereinafter in all embodiments, and is generally referred to as "wireless communication node". Further, a wireless communication node, hereinafter, also refers to a specific user equipment (UE), which includes one of the following: a roadside unit (RSU), a leading UE in a vehicular communication group (platoon), a UE in a sidelink group specified by the BS for scheduling and configuring sidelink resources to other UEs in a sidelink communication group A terminal-side communication device is represented by a user equipment (UE) 104 hereinafter in all embodiments, and is generally referred to as "wireless communication devices". Such communication nodes and devices may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a BS 102A, a first UE 104-1, and a second UE 104-2. The first UE 104-1 is a vehicle that is moving in a first cell 101 covered by the BS 102. In some embodiments, the UE 104-1 has direct communication channels 103 with the BS 102. The second UE 104-2 can be also a vehicle that is moving out of the coverage of the cell 101 covered by the BS 102, and does not have a direct communication channel with the BS 102A. Although the UE 104-2 does not have a direct communication channel with the BS 102, it forms a direct communication channel 105 with its neighbor UEs, e.g., UE 104-1 within a sidelink (SL) communication group 112. The direct communication channels between the UE 104 and the BS 102 can be through interfaces such as an Uu interface, which is also known as UMTS (Universal Mobile Telecommunication System (UNITS) air interface. The direct communication channels 105 between the UEs 104 can be through a PC5 interface, which is introduced to address high moving speed and high density applications such as Vehicle-to-everything (V2X) and Vehicle-to-Vehicle (V2V) communications. The BS 102 is connected to a core network (CN) 108 through an external interface 107, e.g., an Iu interface, an NG interface, and an Si interface according to types of the BS 102.

The first UE 104-1 obtains its synchronization reference from the BS 102, which obtains its own synchronization reference from the CN 108 through an internet time service, such as a common time NTP (Network Time Protocol) server or a RNC (Radio Frequency Simulation System Network Controller) server. This is known as network-based synchronization. Alternatively, the BS 102 can also obtain synchronization reference from a Global Navigation Satellite System (GNSS) 109 through a satellite signal 106, especially for a large BS in a large cell which has a direct line of sight to the sky, which is known as satellite-based synchronization. The main advantage of the satellite-based synchronization is full independency providing a reliable synchronization signal as long as the station remains locked to a minimum number of GPS (Global Positioning System) satellites. Each GPS satellite contains multiple atomic clocks that contribute very precise time data to the GPS signals. GPS receivers on the BS 102 decode these signals, effectively synchronizing the corresponding BS 102 to the atomic clocks. This enables corresponding BS 102 to determine the time within 100 billionths of a second (i.e., 100 nanoseconds), without the cost of owning and operating atomic clocks.

Similarly, the second UE 104-2 can obtain a synchronization reference from the corresponding BS 102 (not shown) which further obtains its own synchronization reference from the CN 108 or from a GNSS 109, as discussed in detail above. The second UE 104-2 can also obtain a synchronization reference through the first UE 104-1 in sidelink communications, wherein the synchronization reference of the first UE 104-1 can be either network-based or satellite-based, as described above.

Figure 1B:
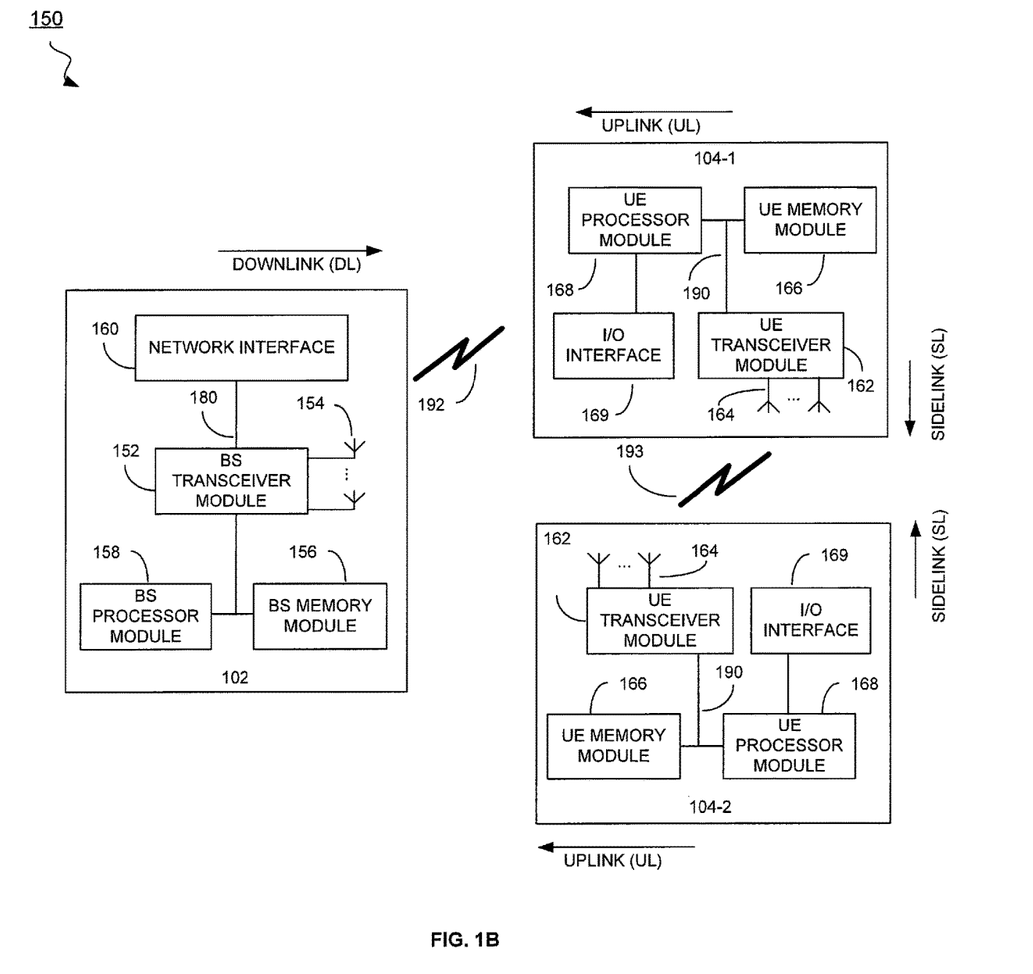
FIG. 1B illustrates a block diagram of an exemplary wireless communication system for a slot structure information indication, in accordance with some embodiments of the present disclosure.

FIG. 1B illustrates a block diagram of an exemplary wireless communication system 150 for transmitting and receiving downlink, uplink and sidelink communication signals, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102, a first UE 104-1 and a second UE 104-2, collectively referred to as BS 102 and UE 104 below for ease of discussion. The BSs 102 each includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and an I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the BS 102 that enable bi-directional communication between BS transceiver 152 and other network components and communication nodes configured to communication with the BS 102. For example, the network interface 160 may be configured to support internet or WiMAX traffic. In a typical deployment, without limitation, the network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell (e.g., 101 for BS 102) where the BS 102 is located, and in general, to operate properly within the cell. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid/heterogeneous communication network in which the UE 104 communicates with the BS 102, and with other UEs, e.g., between the UE 104-1 and 104-2. As described in further detail below, the UE 104 supports sidelink communications with other UE's as well as downlink/uplink communications between the BS 102 and the UE 104. As discussed above, sidelink communication allows the UEs 104-1 and 104-2 within a sidelink communication group 112 to establish a direct communication link with each other, or with other UEs from different cells, without requiring the BS 102 to relay data between UE's.

Figure 2:
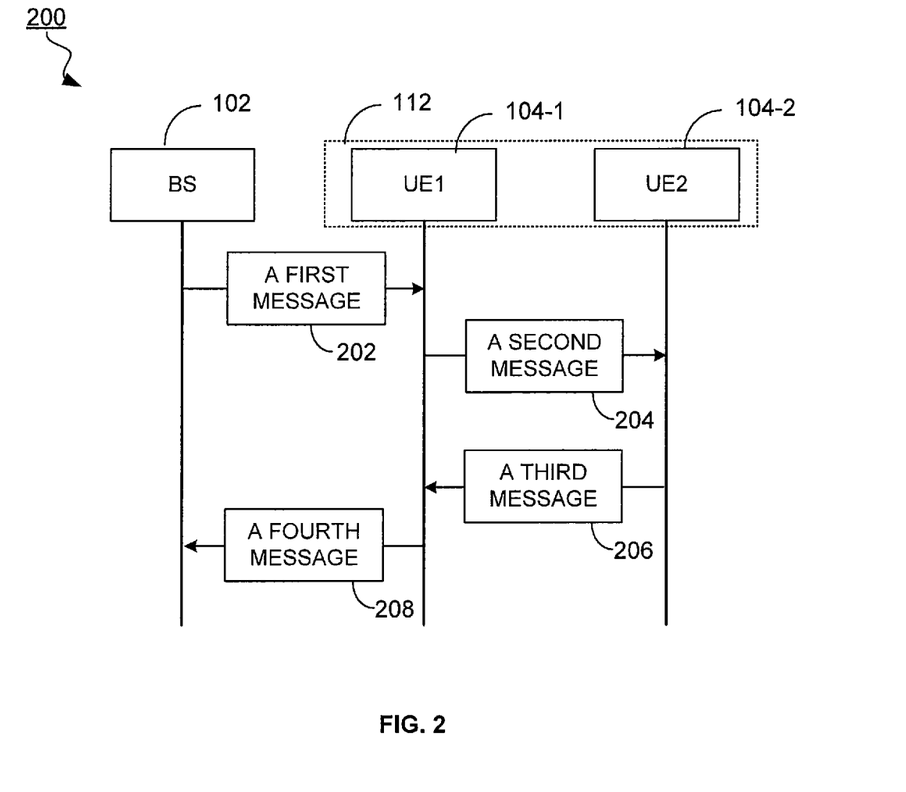
FIG. 2 illustrates a method for configuring sidelink retransmission resources, in accordance with some embodiments of the present disclosure.

FIG. 2 illustrates a method 200 for configuring sidelink retransmission resources, in accordance with some embodiments of the present disclosure. It is understood that additional operations may be provided before, during, and after the method 200 of FIG. 2, and that some operations may be omitted or reordered. The communication system in the illustrated embodiment comprises a BS 102, a first UE 104-1 and a second UE 104-2. In the illustrated embodiments, the first UE 104-1 is in one of at least one serving cell covered by the BS 102, i.e., the first UE 104-1 is in directly connection with the BS 102. It should be noted that the method 200 presented in FIG. 2 is for illustration purposes and not intended to be limiting. The communication system may contain any numbers of BS 102 and UE 104 can be used and are within the scope of this invention.

The method 200 starts with operation 202 in which the BS 102 transmits a first message to the first UE 104-1 according to some embodiments. In some embodiments, the first message is carried by at least one of the following: downlink control information (DCI) and a radio resource control (RRC) message. In some embodiments, the first message comprises a first configuration information set of at least one sidelink resource for sidelink communication. In some embodiments, the at least one sidelink resource each is used for a sidelink transmission, when the first UE 104-1 multicasts a plurality of sidelink signals to a plurality of UEs in the sidelink communication group 112, and/or when the first UE 104-1 perform repetition transmission for transmission reliability (e.g., a protocol data unit or a transmission block during one sidelink transmission), and/or when the first UE 104-1 unicasts a plurality of sidelink signals to the destination UE 104-2.

In some embodiments, the first message further comprises a second configuration information set of at least one uplink control information (UCI) resource in the time and frequency domain, wherein the at least one UCI resource in the first message each corresponds to one of the at least one sidelink resource in the first message. In some embodiments, the at least one UCI resource is used for the first UE 104-1 to transmit a feedback message to the BS 102 based on a received message from the second UE 104-2 in order to inform the BS 102 the status of the corresponding sidelink transmission on the corresponding sidelink resource.

In some embodiments, the first message may further comprise third information of at least one sidelink retransmission resource. In some embodiments, the at least one sidelink retransmission resource each is a resource for retransmitting a potential previously failed sidelink transmission. In some embodiments, the at least one sidelink retransmission resource each has the same configuration as the at least one sidelink resource. In some other embodiments, the BS 102 may configure the sidelink retransmission resource after receiving the feedback message from the first UE 104-1.

In some embodiments, the first message can be also transmitted from a specific UE to other UEs. For example, the specific UE can be one of the following: a roadside unit (RSU), a leading UE 104 in a vehicular communication group (platoon), a UE 104 in a sidelink group specified by the BS 104 for scheduling and configuring sidelink resources to the UEs in the sidelink communication group 112.

In some embodiments, the second configuration information set of the at least one UCI resource comprises a plurality of second configurations of the at least one UCI resource. In some embodiments, the plurality of second configuration of the at least one UCI resource each comprises at least one of the following: a number of first resource units in the time domain, a position of the first resource units in the time domain (e.g., starting symbol in a time slot, a position of the time slot), a number of second resources units in the frequency domain, and a position of the second resource units in the frequency domain. In some embodiments, the position of the first resource units and/or the second resource units in the time domain is relative to the position of the first message (e.g., DCI) in the time domain. In some embodiments, the first resource units each can be one of the following: a symbol, a time slot, a subframe, and a mini time slot. In some embodiments, the second resource units each can be one of the following: a carrier, a subcarrier, a bandwidth part (BWP), a sub-channel, and a physical resource block (PRB). In some embodiments, the first resource units in the time domain and the second resource units in the frequency domain are determined by one of the following: a numerology of signals transmitted on the at least one UCI resource, and a numerology of signals for transmitting the first message. In some embodiments, a numerology is a subcarrier spacing (SCS) and cyclic prefix (CP). In some embodiments, the second configuration information of the at least one UCI resource can be indicated implicitly or explicitly in the first message.

In some embodiments, when at least one of the plurality of second configurations in the second configuration information set of the at least one UCI resource is preconfigured by the system and is by default, the at least one of the plurality of second configurations can be one of the following: not indicated and indicated implicitly in the first message. For example, when a number of PRBs or subcarriers are preconfigured by the system, the number of PRBs or subcarriers is not indicated explicitly in the first message. For another example, when a first carrier or BWP, on which the at least one UCI resource is carried, is the same as the carrier or the BWP used for carrying the corresponding DCI or is the paired carrier or the paired BWP of the carrier or the BWP used for carrying the corresponding DCI, the second information of the at least one UCI resource is not indicated explicitly in the first message. In some embodiments, the second configuration information of the at least one UCI resource further comprises configuration information of transmission parameters, for example, a format supported by an uplink control channel, parameters for cyclic-shifting operation, etc. In some embodiments, the format supported by the uplink control channel comprises a number of symbols and carries a number of bits.

In another embodiment, the second configuration information of the at least one UCI resource can be at least one of the following: configured by at least one high-layer signaling (e.g., an RRC signaling), and indicated by the DCI using an index in the UCI resource configuration table. In some embodiments, the second configuration information comprises at least one UCI resource configuration table. In some embodiments, the at least one UCI resource configuration table each comprises at least one of the following: a plurality of indices and the plurality of indices each corresponds to at least one second configuration of the at least one corresponding UCI resource in the time and frequency domain, and the plurality of indices each corresponds to the at least one transmission parameter of the at least one corresponding UCI resource.

Figure 3:
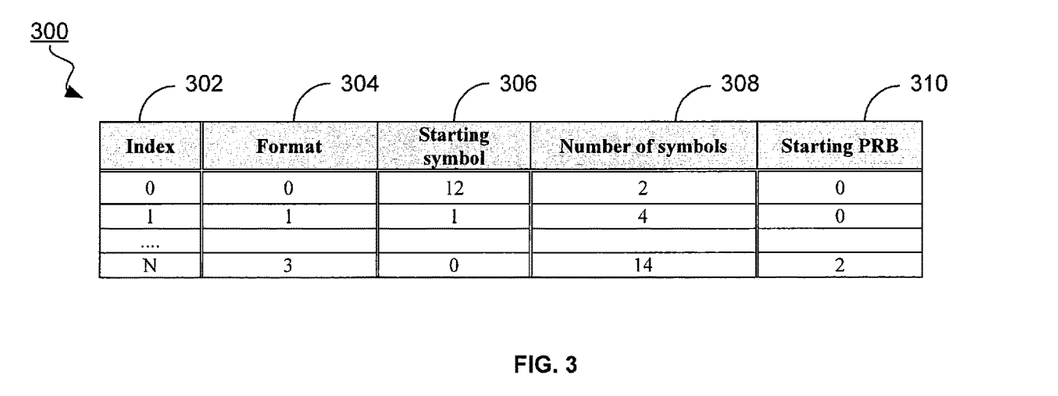
FIG. 3 illustrates a table showing an uplink control information (UCI) resource configuration table, in accordance with some embodiments of the present disclosure.

FIG. 3 illustrates a table 300 showing a UCI resource configuration table, in accordance with some embodiments of the present disclosure. In the illustrated embodiment, the table 300 comprises 3 index values 302, and 4 configuration parameters, i.e., format 304, starting symbol 306, symbol length 308 and starting PRB 310. Although only 4 configuration parameters and 3 values for each configuration parameters are shown in FIG. 3, it should be noted a UCI resource configuration table may comprise any numbers of various different configuration parameters with any values for the at least one UCI resource can be included which are within the scope of this invention. In some embodiments, a UCI resource configuration table can be used together with an explicit indication to determine all of the configuration parameters of at least one UCI resource corresponding to at least one sidelink resource.

In the illustrated embodiment of FIG. 3, at an index of 0, the format 304 of a UCI resource (or PUCCH, physical uplink control channel) is 0; a starting symbol 306 in a time slot is 12, a symbol length 308 is 2, and a starting PRB 310 in the frequency domain is 0. Similarly, at an index of 1, the format 304 of a UCI resource is 1; the starting symbol 306 in a time slot is 1, the symbol length 308 is 4, and the starting PRB 310 in the frequency domain is 0. At an index of N, wherein N is a positive integer, the format 304 of a UCI resource is 3; the starting symbol 306 in a time slot is 0, the symbol length 308 is 14, and the starting PRB 310 in the frequency domain is 2.

In some embodiments, the at least one UCI resource set can be semi-persistently (pre-)configured by the BS 102 to the first UE 104-1 through an RRC signaling. In some embodiments, the at least one UCI resource set is periodic. In some embodiments, the at least one UCI resource set in one period each comprises at least one UCI resource for transmitting UCI of a respective sidelink signal. In some embodiments, a position in the time and frequency domain of the at least one UCI resource in the at least one UCI resource set in one period and the information of the transmission parameters can be also indicated by the RRC signaling from the BS 102.

In some embodiments, when the at least one sidelink resource is indicated in the DCI by the BS 102, at least one corresponding sidelink resource identifier can be also indicated by the BS 102 to the first UE 104-1. In some embodiments, the at least one sidelink resource identifier each can be one of the following: a hybrid automatic repeat request (HARQ) process identifier, and a sidelink process identifier, and a UE identifier. In some embodiments, when the UE 104 transmits UCI on a corresponding UCI resource configured by the BS 102, the UCI transmitted from the UE 104 to the BS 102 also comprises a corresponding sidelink resource identifier. In some embodiments, an indication of the corresponding sidelink resource identifier in the UCI can be explicit carried in the UCI or implicit. In some embodiment, an implicit indication of the sidelink resource identifier can be one of the following: using a corresponding sequence and using the sidelink resource identifier to perform corresponding processing on the UCI. In some embodiments, the corresponding processing comprises one of the following: scrambling and cyclic shifting.

In some embodiments, a sidelink resource set comprises at least one sidelink resource, wherein the at least one sidelink resource a sidelink resource set corresponds to a same UCI. In some embodiments, the UCI can be used to indicate whether a sidelink transmission on each of the at least one sidelink resource in the sidelink resource set is successful. In some embodiments, when the sidelink transmission comprises a plurality of sub-blocks, the UCI can be also used to indicate whether each of the plurality of sub-blocks in the sidelink transmission is successful. In some embodiments, the at least one sidelink resource in the sidelink resource set can be used as the sidelink retransmission resource for retransmitting sidelink signals. In some other embodiments, the at least one sidelink resource in the sidelink resource set can be used to transmit different sidelink data. In some embodiments, the at least one sidelink resource in the sidelink resource set can be indicated by at least one DCI or a RRC signaling. In some embodiments, the at least one sidelink resource in the sidelink resource set can be on the same carrier or on different carriers.

In some embodiments, the first message is a sidelink grant message, wherein the sidelink grant message comprises the first configuration information set of the at least one sidelink resource in the time and frequency domain for sidelink communication. Further, the sidelink grant message also comprises the second configuration information set of the at least one UCI resource in the time and frequency domain. In some embodiments, the first configuration information set of the at least one sidelink resource comprises a plurality of first configurations of the at least one sidelink resource; and the second configuration information set of the at least one UCI resource comprises a plurality of second configurations of the at least one UCI resource. The plurality of first configurations and the plurality of second configurations each comprises at least one of the following: a position and/or a number of first resource units in the time domain, a position and/or a number of second resource units in the frequency domain. In some embodiments, the first configuration information of the at least one sidelink resource can be indicated implicitly or explicitly in the sidelink grant message. In some embodiments, the at least one UCI resource is used for transmitting a request for at least one sidelink retransmission resource by the first UE 104 to the BS 102.

The method 200 continues with operation 204 in which the first UE 104-1 transmits a second message to the second UE 104-2 according to some embodiments. In some embodiments, the second message is a sidelink signal, wherein the sidelink signal can be one of the following: unicast, multicast and broadcast from the first UE 104-1 to the second UE 104-2. In some embodiments, the second message is transmitted on the at least one sidelink resource indicated in the first message. In some embodiments, the second message further comprises sidelink control information (SCI), wherein the SCI is used to indicate the at least one sidelink resource and the at least one corresponding UCI resource from the first UE 104-1 to the second UE 104-2.

The method 200 continues with operation 206 in which the first UE 104-1 receives a third message from the second UE 104-2 according to some embodiments. In some embodiments, the third message is transmitted by the second UE 104-2 on the at least one sidelink resource, which is indicated in the second message received from the first UE 104-1. In some embodiments, the third message comprises a feedback message containing a status of the transmission from the first UE 104-1 and the reception by the second UE 104-2 of the second message. Specifically, when the transmission and/or reception of the second message is successful, the third message indicates that the sidelink transmission is successful; and when the transmission and/or reception of the second message is failed, the third message indicates that the sidelink transmission is failed.

The method 200 continues with operation 208 in which the first UE 104-1 transmits a fourth message to the BS 102 according to some embodiments. In some embodiments, the fourth message is transmitted on the at least UCI resource indicated in the first message from the BS 102. In some embodiments, the fourth message comprises one of the following: an ACK/NACK message corresponding to a sidelink transmission and a schedule request (SR) signal for a corresponding sidelink transmission. For example, when a sidelink NACK is transmitted or when a SR signal is transmitted in the fourth message from the first UE 104-1 to the BS 102, the fourth message is used to request the at least one sidelink retransmission resource. In this case, after receiving the fourth message from the first UE 104-1, the BS 102 may transmit another first message with the sidelink grant message to the first UE 104-1. Similarly, when a sidelink ACK is transmitted, or when no SR signal is transmitted, or when a negative SR signal is transmitted in the fourth message from the first UE 104-1 to the BS 102, the fourth message does not request the at least one sidelink retransmission resource.

In some embodiments, the fourth message comprises release information, wherein the release information is used to release the at least one sidelink resource. In some embodiments, the release information can be one of the following: a sidelink ACK/NACK information and a scheduling release signal for sidelink transmission. In some embodiments, when the release information is a sidelink ACK, the at least one sidelink resource can be released. For example, a BS 102 allocates m sidelink resources and m−1 corresponding UCI resources in the first message to the UE 104. When an i-th sidelink transmission is successful, the release information in the fourth message informs the BS 102 to release the resources [i+1:m] in the m resources, wherein m and i are positive integers. In some embodiments, the released resources [i+1:m] can be allocated for other UEs 104 in the same sidelink communication group 112 or in a different sidelink communication group for sidelink communications.

In some embodiments, when at least one sidelink retransmission resource is allocated by the BS 102 to the first UE 104-1, the fourth message comprises confirmation information, wherein the confirmation information is used to confirm the use of one of the at least one sidelink retransmission resource for next sidelink transmission (e.g., confirm the use of the next sidelink resource of the at least one sidelink retransmission resource), when the previous sidelink transmission is failed. In some embodiments, the confirmation information in the fourth message can be one of the following: a sidelink ACK/NACK message corresponding to a sidelink transmission and a schedule confirm signal for a corresponding sidelink transmission. In some embodiments, when the confirmation information is a sidelink NACK, one of the at least one sidelink retransmission resource can be used for the second sidelink transmission. In this case, when the BS 102 receives confirmation information on the at least one UCI resources, the BS 102 assume that the first UE continues to use the at least one sidelink retransmission resource for the next sidelink transmission.

In some embodiments, when the second UE 104-2 is in one of the at least one cell covered by the BS 102, the UE 104-2 can directly communicate with the BS 102. In this case, the second UE 104B can directly receive the first configuration information of the at least one sidelink resource and the second configuration information of the at least one UCI resource from the BS 102, or can receive the first configuration information set of the at least one sidelink resource and the second configuration information set of the at least one UCI resource from the SCI transmitted by the first UE 104-1. In some embodiments, the second UE 104-2 can directly transmit a message to the BS 102 to request, release or confirm the at least one sidelink resource for sidelink retransmission.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method of performing sidelink communications, comprising:

transmitting a first message to a first wireless communication device; and receiving a second message from the first wireless communication device, wherein the first message comprises first information of at least one first resource for sidelink transmission and second information of at least one second resource for uplink control information (UCI), wherein the second message is received from the first wireless communication device on the at least one second resource;

prior to the receiving the second message, transmitting a third message by the first wireless communication device to a second wireless communication device; and receiving a fourth message by the first wireless communication device from the second wireless communication device,
wherein each of the third and fourth messages is transmitted or received on the at least one first resource, and wherein the fourth message comprises a feedback message to indicate whether the sidelink transmission is successful or unsuccessful.

2. The method of claim 1, wherein the first message is transmitted on at least one of the following: downlink control information (DCI) and a radio resource control (RRC) message.

3. The method of claim 1, wherein the second information of the at least one second resource further comprises at least one corresponding transmission parameter, wherein the at least one transmission parameter comprises at least one of the following: a format and a cyclic-shifting operation.

4. The method of claim 1, wherein the first and second information each comprises at least one of the following: a number of time-domain resource units, a position of the time-domain resource units, a number of frequency-domain resource units, and a position of the frequency-domain resource units, wherein the time-domain resource units each is one of the following: a symbol, a time slot, a subframe, and a mini time slot, and wherein the frequency-domain resource units each is one of the following: a carrier, a subcarrier, a bandwidth part (BWP), a sub-channel, and a physical resource block (PRB).

5. The method of claim 4, wherein the time-domain resource units and the frequency-domain resource units each is determined by a numerology of one of the following: a first wireless signal transmitted on the at least one first resource, a second wireless signal transmitted on the at least one second resource, and a third wireless signal for transmitting the first message, wherein the numerology is a subcarrier spacing (SCS) and a cyclic prefix (CP).

6. The method of claim 1, wherein the second information of the at least one second resource in the first message is one of the following: configured by a semi-persistent signaling and indicated using an index in at least one second resource configuration table, wherein the at least one second resource configuration table each comprises a plurality of indices, wherein the plurality of indices each corresponds to at least one of the following: a configuration of one of the at least one corresponding second resource in the time and frequency domain, and at least one corresponding transmission parameter.

7. The method of claim 1, wherein the first message further comprises at least one respective sidelink resource identifier, wherein the at least one respective sidelink identifier is one of the following: a hybrid automatic repeat request (HARQ) process identifier, and a sidelink process identifier, and an identifier of the first wireless communication device.

8. The method of claim 7, wherein the second message further comprises the at least one respective sidelink identifier, wherein the at least one respective sidelink identifier is indicated by one of the following: using a corresponding sequence and using the sidelink resource identifier to perform corresponding processing on the UCI, wherein the corresponding processing comprises one of the following: scrambling and cyclic shifting.

9. The method of claim 1, wherein the third message comprises at least one sidelink transmission and sidelink control information (SCI), wherein the SCI is used to transmit the first information of the at least one first resource and the second information of the at least one corresponding second resource from the first wireless communication device to the second wireless communication device.

10. A method performed by a first wireless communication device, comprising:
receiving a first message from a wireless communication node; and
transmitting a second message to the wireless communication node,
wherein the first message comprises first information of at least one first resource for sidelink transmission and second information of at least one second resource for uplink control information (UCI), wherein the second message is transmitted from the first wireless communication device on the at least one second resource;
prior to the transmitting the second message,
transmitting a third message by the first wireless communication device to a second wireless communication device; and
receiving a fourth message by the first wireless communication device from the second wireless communication device,
wherein each of the third and fourth messages is transmitted or received on the at least one first resource, and wherein the fourth message comprises a feedback message to indicate whether the sidelink transmission is successful or unsuccessful.

11. The method of claim 10, wherein the first message is received on at least one of the following: downlink control information (DCI) and a radio resource control (RRC) message.

12. The method of claim 10, wherein the second information of the at least one second resource further comprises at least one corresponding transmission parameter, wherein the at least one transmission parameter comprises at least one of the following: a format and a cyclic-shifting operation.

13. The method of claim 10, wherein the first and second information each comprises at least one of the following: a number of time-domain resource units, a position of the time-domain resource units, a number of frequency-domain resource units, and a position of the frequency-domain resource units, wherein the time-domain resource units each is one of the following: a symbol, a time slot, a subframe, and a mini time slot, and wherein the frequency-domain resource units each is one of the following: a carrier, a subcarrier, a bandwidth part (BWP), a sub-channel, and a physical resource block (PRB).

14. The method of claim 13, wherein the time-domain resource units and the frequency-domain resource units each is determined by a numerology of one of the following: a first wireless signal transmitted on the at least one first resource, a second wireless signal transmitted on the at least one second resource, and a third wireless signal for transmitting the first message, wherein the numerology is a subcarrier spacing (SCS) and a cyclic prefix (CP).

15. The method of claim 10, wherein the second information of the at least one second resource in the first message is one of the following: configured by a semi-persistent signaling and indicated using an index in at least one second resource configuration table, wherein the at least one second resource configuration table each comprises a plurality of indices, wherein the plurality of indices each corresponds to at least one of the following: a configuration of one of the at least one corresponding second resource in the time and frequency domain, and at least one corresponding transmission parameter.

16. The method of claim 10, wherein the first message further comprises at least one respective sidelink resource identifier, wherein the at least one respective sidelink identifier is one of the following: a hybrid automatic repeat request (HARQ) process identifier, and a sidelink process identifier, and an identifier of the first wireless communication device.

17. The method of claim 16, wherein the second message further comprises the at least one respective sidelink identifier, wherein the at least one respective sidelink identifier is indicated by one of the following: using a corresponding sequence and using the sidelink resource identifier to perform corresponding processing on the UCI, wherein the corresponding processing comprises one of the following: scrambling and cyclic shifting.

18. The method of claim 10, wherein the third message comprises at least one sidelink transmission and sidelink control information (SCI), wherein the SCI is used to transmit the first information of the at least one first resource and the second information of the at least one corresponding second resource to the second wireless communication device.

* * * * *